United States Patent
Dahl et al.

(10) Patent No.: US 7,128,341 B1
(45) Date of Patent: Oct. 31, 2006

(54) ALL-TERRAIN VEHICLE STORAGE BOX

(75) Inventors: Nathan Dahl, Salol, MN (US); Tim Wysocki, Roseau, MN (US); Jeff Lovold, Roseau, MN (US); Tony Pink, Prior Lake, MN (US); Todd Dannenberg, Rogers, MN (US); Tom McCoubrey, Manitoba (CA)

(73) Assignee: Polaris Industries Inc., Medina, MN (US)

( * ) Notice: Subject to any disclaimer, the term of this patent is extended or adjusted under 35 U.S.C. 154(b) by 11 days.

(21) Appl. No.: 10/376,959

(22) Filed: Feb. 28, 2003

(51) Int. Cl.
*B60R 9/06* (2006.01)

(52) U.S. Cl. .................. 280/769; 180/908; 224/401; 296/37.1

(58) Field of Classification Search ............. 280/769; 180/908, 292, 69.2, 69.24; 224/401, 423, 224/488; 296/37.1
See application file for complete search history.

(56) References Cited

U.S. PATENT DOCUMENTS

| | | | | |
|---|---|---|---|---|
| 4,247,030 A | * | 1/1981 | Amacker | 224/401 |
| 4,826,057 A | | 5/1989 | Yamada | 224/32 A |
| 4,844,309 A | * | 7/1989 | Aubin et al. | 224/401 |
| 5,064,016 A | | 11/1991 | Iwai et al. | 180/215 |
| 5,076,387 A | | 12/1991 | Oka | 180/215 |
| 5,107,952 A | * | 4/1992 | Matsubayashi et al. | 180/349 |
| 5,573,162 A | * | 11/1996 | Spencer et al. | 224/401 |
| D378,080 S | | 2/1997 | Walters et al. | D12/407 |
| 5,753,162 A | | 5/1998 | Fasano et al. | 264/66 |
| 6,016,943 A | | 1/2000 | Johnson et al. | 224/401 |
| 6,145,719 A | | 11/2000 | Robert | 224/401 |
| 6,209,941 B1 | | 4/2001 | Cross | 296/37.1 |
| 6,224,134 B1 | | 5/2001 | Johnson et al. | 296/75 |
| 6,296,163 B1 | | 10/2001 | Kitao et al. | 224/401 |
| 6,340,186 B1 | | 1/2002 | Johnson et al. | 293/120 |
| 6,425,510 B1 | | 7/2002 | King | 224/401 |
| 6,502,728 B1 | * | 1/2003 | Savant | 224/401 |
| 6,533,339 B1 | * | 3/2003 | Bettin et al. | 296/37.1 |
| D481,351 S | * | 10/2003 | Brooks | D12/409 |
| 6,705,680 B1 | * | 3/2004 | Bombardier | 298/17 R |
| 6,729,516 B1 | * | 5/2004 | Hanagan | 224/423 |
| 6,732,830 B1 | * | 5/2004 | Gagnon et al. | 180/291 |
| 6,776,250 B1 | * | 8/2004 | Kuji et al. | 180/68.3 |
| 2001/0052707 A1 | | 12/2001 | Johnson et al. | 293/120 |
| 2002/0047257 A1 | * | 4/2002 | Rondeau et al. | 280/849 |
| 2002/0070255 A1 | | 6/2002 | Hebert et al. | 224/401 |
| 2003/0047576 A1 | * | 3/2003 | Babbitt et al. | 224/401 |

* cited by examiner

*Primary Examiner*—Jeff Restifo
(74) *Attorney, Agent, or Firm*—Baker & Daniels LLP

(57) ABSTRACT

A front storage box for use on an all-terrain vehicle. The front storage box comprises two components: an accessory box and a cargo rack. The accessory box forms a storage compartment in which cargo may be stowed. The cargo rack is integral with a lid for the accessory box and functions to both seal the accessory box and act as a rack. Thus, items may be placed in the accessory box and on the rack for hauling.

23 Claims, 7 Drawing Sheets

ALL-TERRAIN VEHICLE STORAGE BOX

TECHNICAL FIELD

The invention relates to a storage box for an ATV, and, in particular, to an ATV storage box including a lid with an integral rack.

BACKGROUND OF THE INVENTION

The present invention relates to a storage box for an all terrain vehicle (ATV). More specifically, the invention relates to a storage compartment that functions both as a storage box and as a storage rack.

All-terrain vehicles (ATVs) are multipurpose vehicles that are popular for recreational use, such as camping and fishing, and utility use either on the job or around the house, for example, for gardening, landscaping, laying mulch, snowplowing, pulling or pushing light wheeled equipment. The adaptability and versatility of an ATV can support many off-road tasks within agriculture, forestry, horticulture and similar outdoor industries. ATVs easily traverse various off-highway trails, reach rugged locations that other vehicles cannot, and offer business operators the opportunity to accomplish work in the field at significant financial savings when compared to using a truck or tractor. Utility ATVs, especially suited for hauling and towing as well as trail riding, are as popular as ATVs for weekend recreational riding. ATVs are also used by older persons to rediscover areas of the outdoors that have become inaccessible to them. ATVs operate in all climates and are among the most versatile vehicles in operation today.

ATVs are off-road vehicles characterized by having four wheels (two front and two rear) with low pressure tires, handlebars connected to the front wheels for steering, a straddle-type seat designed for a single rider (although the seat may be designed to accommodate multiple passengers), laterally extending footrests on opposite sides of the vehicle, and an engine and transmission located generally beneath the straddle-type seat and substantially between the footrests. ATVs are generally not wider than about 50 inches; most commonly about 44 to 48 inches in overall width. The transmission typically is connected by a suitable drive train to the rear wheels. In many applications, it is desirable to have all four wheels driven by the engine. Four wheel drive ATVs usually have one drive train connecting the transmission to the rear wheels and a separate drive train connecting the transmission to the front wheels.

ATVs and other utility vehicles often incorporate carrying racks and similar components for holding and transporting cargo, equipment or the like. Often, these carrying racks are constructed from tubular frames, with wire mesh or panels forming the body of said racks. The carrying racks may be constructed of continuous panels, the panels forming the vertical walls and support base of the racks. Alternately, ATV carrying racks are sometimes integrally molded.

Currently, ATVs offer front and rear racks to carry cargo on the front or rear of the ATV, respectively. These are primarily useful for hauling large items that can be secured to the rack. Typically, smaller items are difficult to secure to standard front or rear racks and cannot be conveniently hauled using either rack. This problem can be alleviated by providing accessory boxes for mounting on the rack of the ATV. Usually, when a box or other storage container is mounted on a rack, bungee cords or the like are connected to opposite sides of the rack and extended over the box. Small items may be placed in the accessory box. However, by mounting the box on the rack, the rack can no longer be used to haul large items. Further, the bungee cords may interfere with the use of the box such as the placement of items within the box or the removal of items from the box.

SUMMARY OF THE INVENTION

The invention comprises an ATV Storage Box having both accessory box and rack functionalities. The storage box is configured for direct attachment to the frame at the front of an ATV. The box is formed of two components, an accessory box and a lid/rack. The accessory box provides a volume in which items can be stored. The lid attaches to the accessory box and functions as a cargo rack. To facilitate use of the cargo rack, the accessory box is formed of a suitably strong material, such as glass reinforced plastic, to support the weight put on the cargo rack. In addition, the cargo rack may be provided with mounted D-rings. The accessory box bolts directly to the ATV frame.

The storage of the present invention provides an accessory box or recessed cargo area as well as an integrated cargo rack for storing and/or transporting cargo and other equipment on an ATV. The accessory box comprises a base and upwardly extending vertical front, side, and rear walls, together defining a compartment for holding cargo. The utility rack of the invention is integral with a lid for the accessory box. The accessory box and rack are positioned at or near the front of an ATV, and may be mounted below the line of sight of the ATV operator. As a result, the storage box, mounted at or near the front of an ATV, will not impede the ability of an operator to safely operate the ATV.

DETAILED DESCRIPTION OF THE INVENTION

Figure 1:
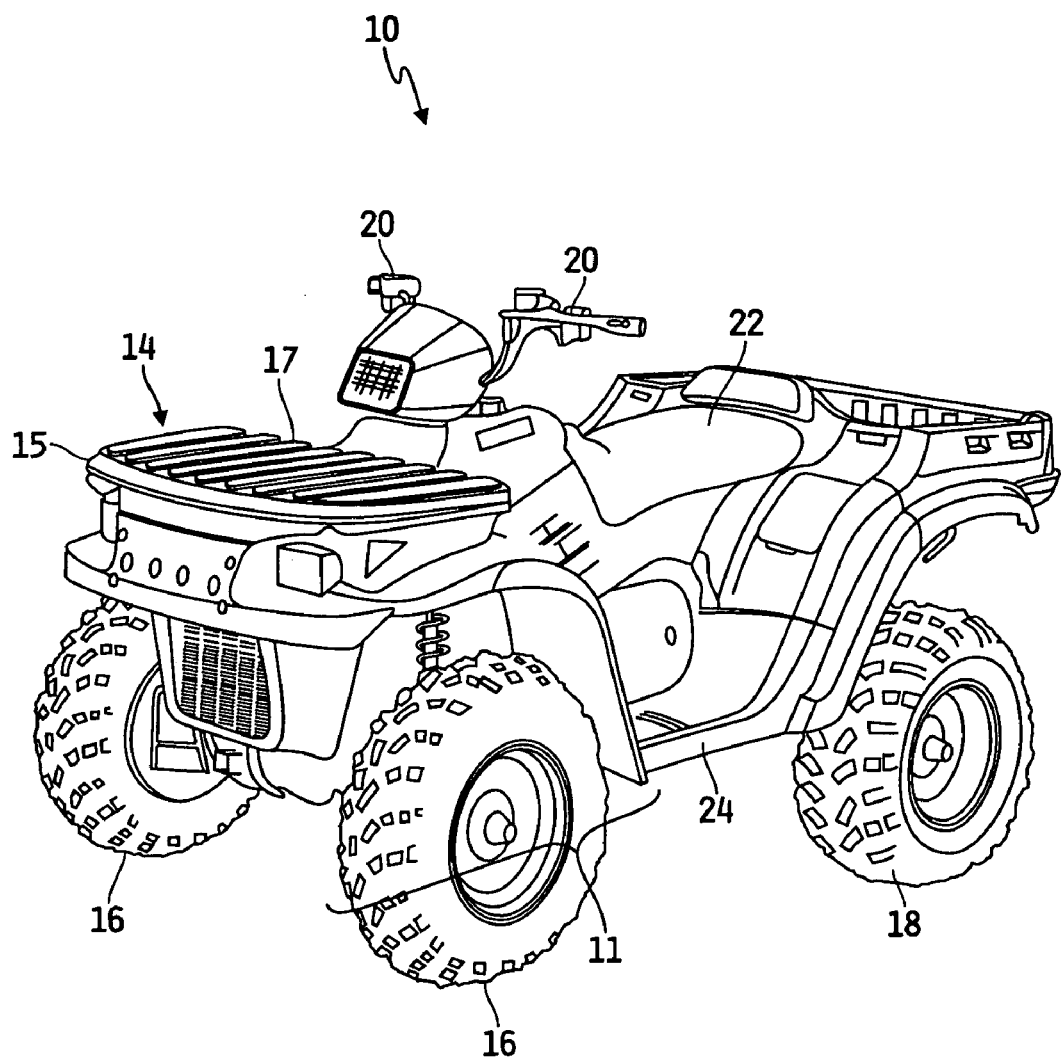
FIG. 1 is a side view of an all-terrain vehicle including a front storage box in accordance with one embodiment of the present invention.
Figure 2:
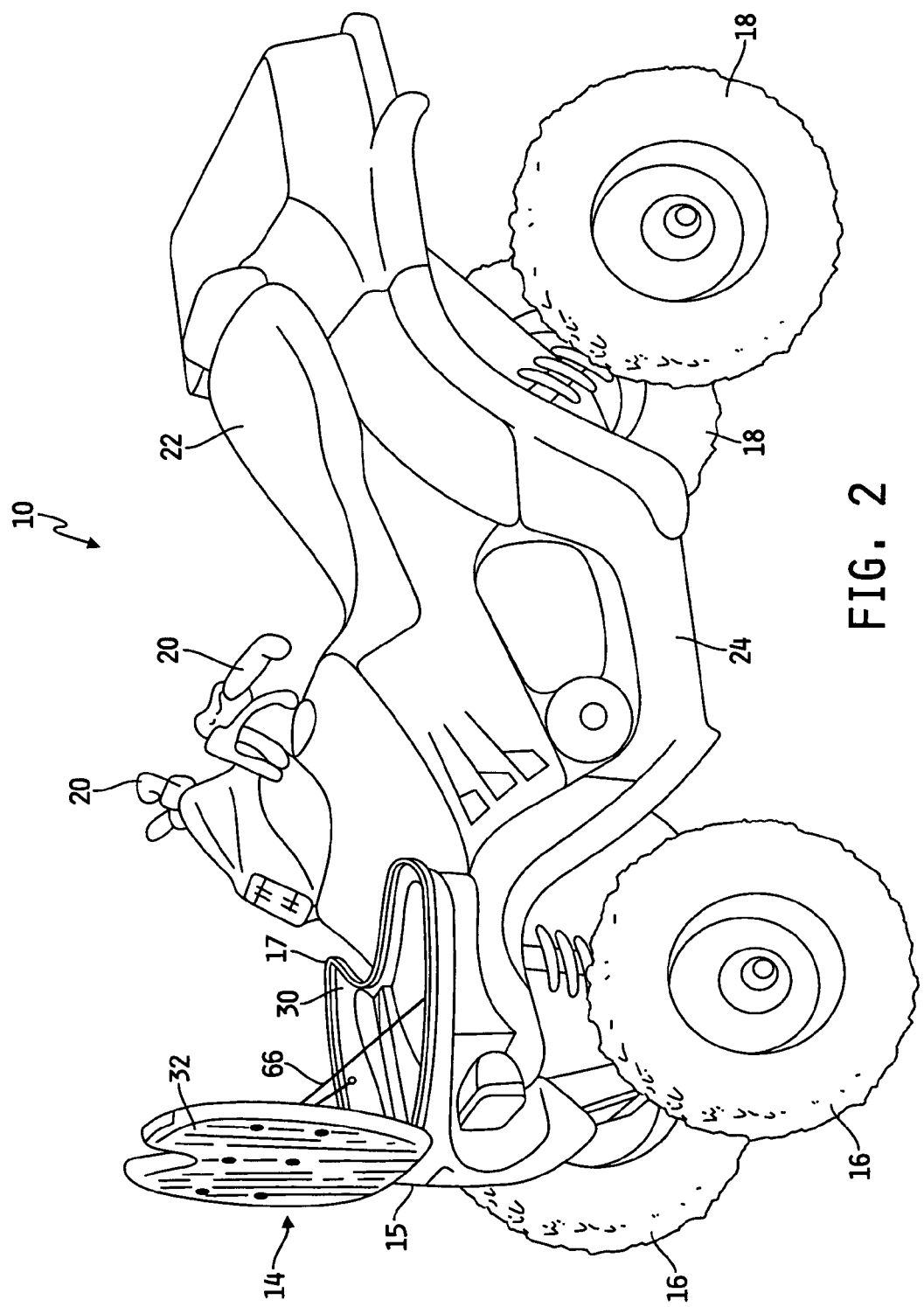
FIG. 2 is a side view of an all-terrain vehicle including a front storage box in accordance with one embodiment of the present invention wherein the front storage box is in an open position.

FIGS. 1 and 2 illustrate an ATV 10 with a front storage box 14 in accordance with the present invention. FIG. 1 shows the front storage box 14 is shown in a closed configuration. FIG. 2 shows the front storage box 14 is shown in an open configuration. The ATV 10 includes a chassis to which the various systems and components of the vehicle, including the front storage box 14, are attached. These components include front wheels 16, rear wheels 18, handlebars 20 connected by a suitable steering linkage to the front wheels 16 for steering the ATV 10, and a straddle-type seat 22 upon which a rider sits. The front storage box 14 is positioned over the front cab portion 11 of the ATV 10.

An engine and a transmission are carried on the chassis generally beneath the straddle-type seat 22 and substantially between a pair footrests 24 (only the left footrest is visible in FIGS. 1 and 2). The engine is carried by the chassis and is connected to a drive train to supply motive power to at least some of the wheels. The transmission may be a manual transmission, connected through a mechanical linkage to a foot-operated shift lever positioned on the left side of the vehicle adjacent to the footrest (if desired, however, the shift lever could be located on the right side). The shift lever is movable upwardly and downwardly through a range of motion to shift the transmission among a number of forward gears. Up-shifting is achieved by squeezing the clutch lever, moving the toe portion of one's foot beneath the laterally extending shift lever and then lifting up on the shift lever. Down-shifting is accomplished by squeezing a clutch lever on the handlebars and then pressing down on the laterally extending shift lever. As the present invention is not specific to the transmission of the ATV, an automatic or semi-automatic transmission may be used in place of a manual transmission. In ATVs equipped with semi-automatic transmissions, an automatic clutching mechanism eliminates the need for a handlebar mounted clutch lever.

As shown in FIGS. 1 and 2, the front storage box 14 has a forward edge 15 at the front of the of the ATV and a rearward edge 17 generally along the handlebars 20. The ATV front storage box 14 secures to the ATV's frame or body components. Preferably, the front storage box 14 secures to the front cab of the ATV.

Figure 3:
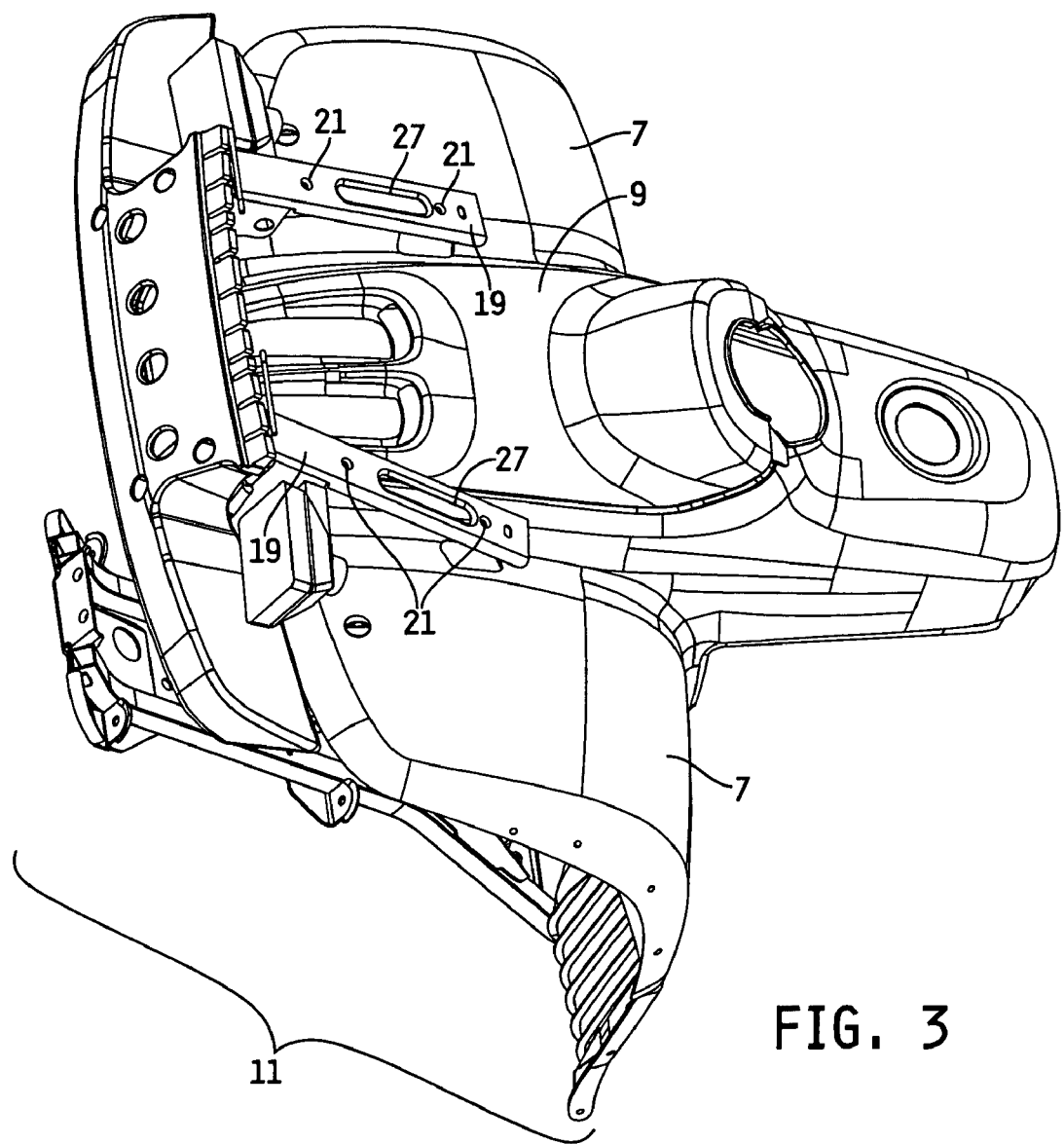
FIG. 3 is a cut-away view of a front portion of an ATV cab in accordance with one embodiment of the present invention.
Figure 4:
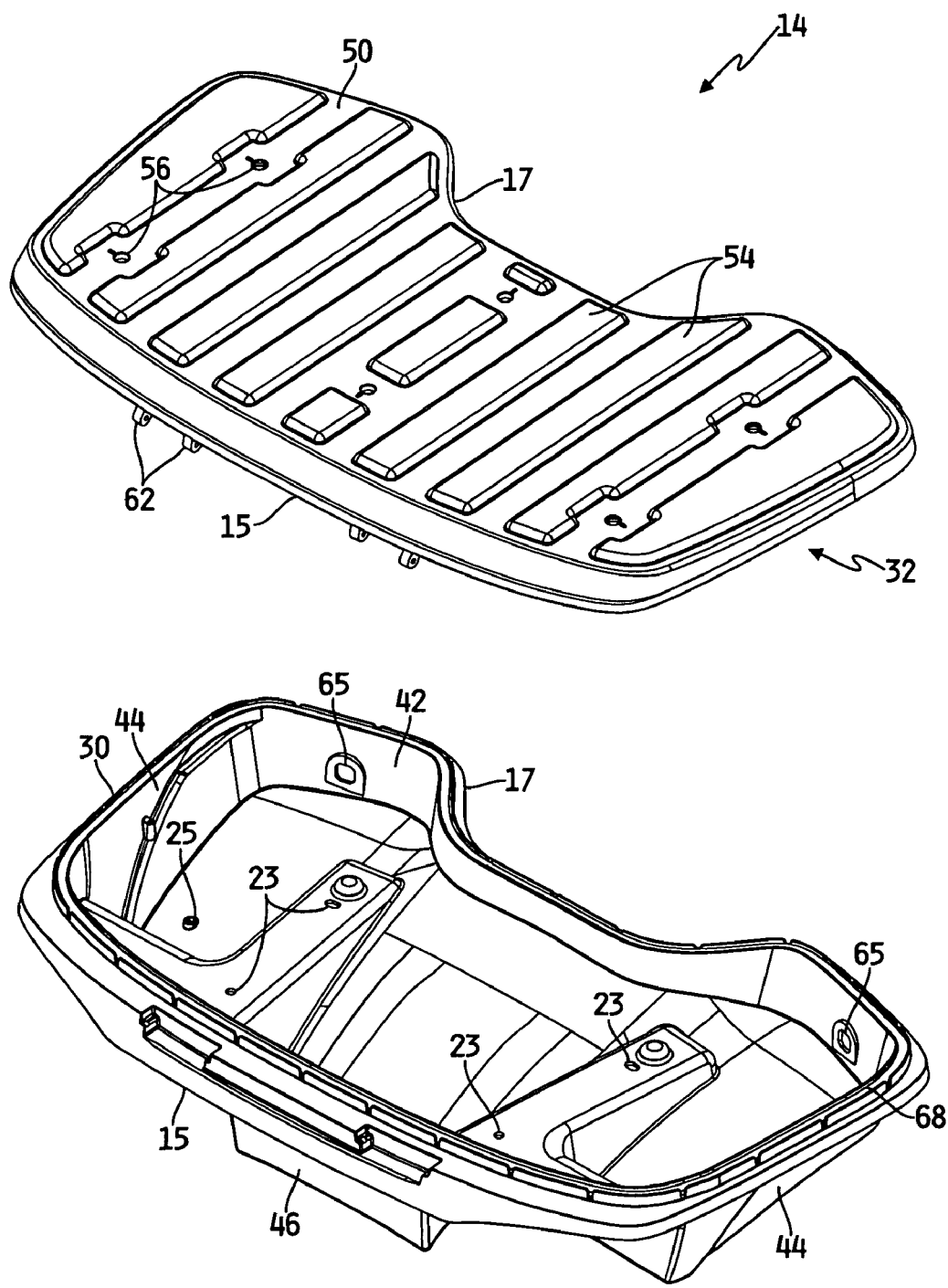
FIG. 4 is a front exploded view of a front storage box in accordance with one embodiment of the present invention.
Figure 5:
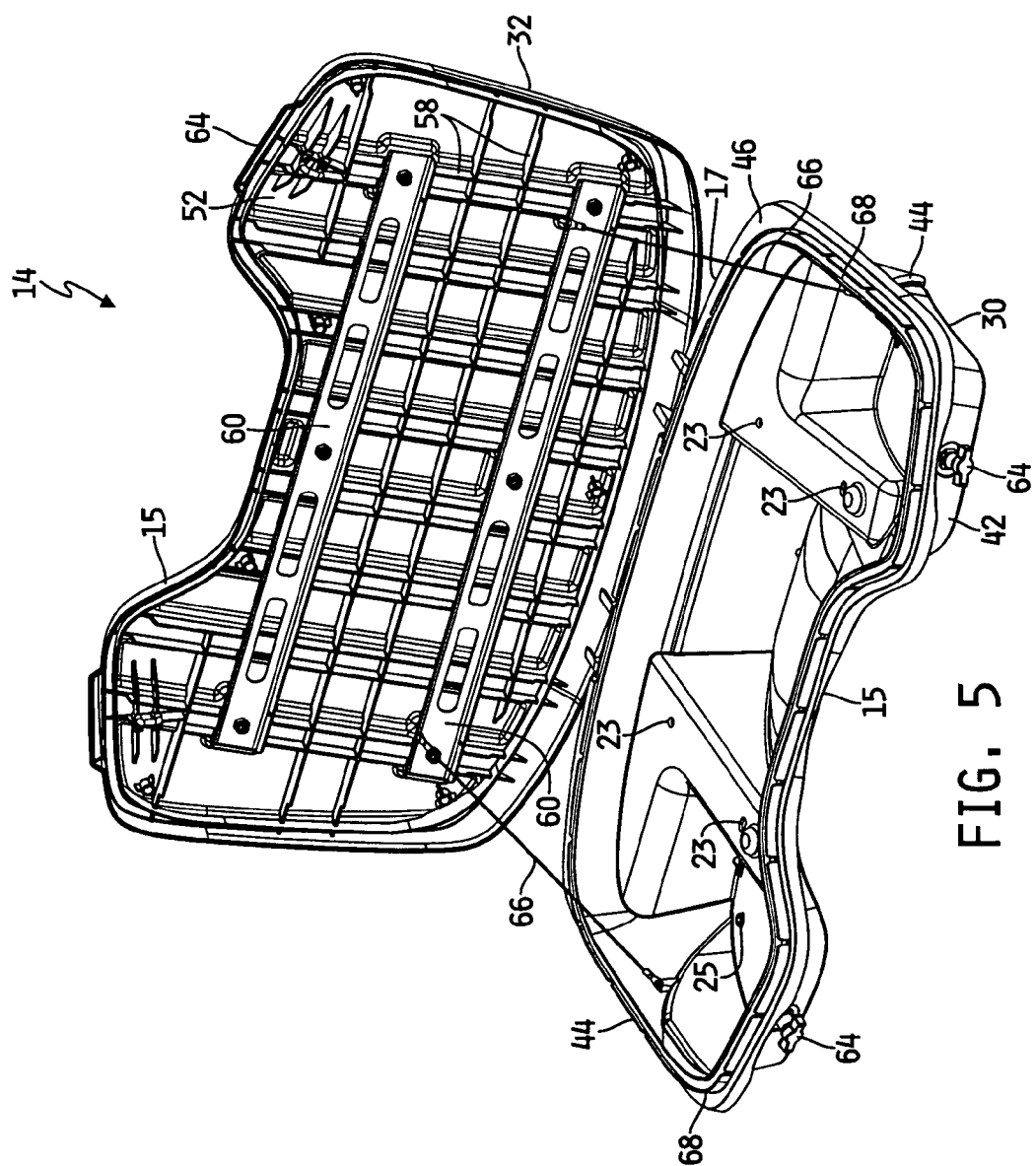
FIG. 5 is a rear view of an open front storage box in accordance with one embodiment of the present invention.

With particular reference to FIG. 3, the front cab portion 11 of the ATV 10 is illustrated without the front wheels 16, front storage box 14, handlebars 20 or straddle-type seat 22 attached. FIG. 3 shows one embodiment of a configuration for securing the front storage box 14 to the front cab portion 11. The front storage box 14 is secured approximately over the front wheel covers 7 and a central portion 9 of the front cab portion 11. First and second metal channels 19 are provided extending generally from a rearward point, near the mounted position of the rearward edge 17 of the front storage box 14, to a forward point, near the mounted position of the forward edge 15 of the front storage box 14. The front storage box 14 is mounted to these channels 19 with approximately two fasteners along each channel 19. Mounting points 21 are provided along the channels 19 for receiving the fasteners. Cut outs 27 may be provided for reducing the weight of the channels 19. Additionally, fasteners may be used attach the front storage box 14 to the front cab portion 11 the ATV 10 to secure the front storage box 14 rigidly to the front cab portion 11. Such additional fasteners are not necessary for securement but may be desirable for additional rigidity of the front storage box 14 to the front cab portion 11. The mounting points 23 on the storage box 14 for receiving fasteners that couple the storage box 14 to the metal channels 19 are shown in most clearly in FIGS. 4 and 5. One of the mounting points 25 on the storage box 14 for receiving a fastener for coupling the storage box 14 directly to the cab is also shown in FIGS. 4 and 5. The complementary mounting point is approximately symmetrically placed on the opposite lateral side of the storage box 14.

Referring to FIGS. 4 and 5, the front storage box 14 comprises two main components: an accessory box 30 and a lid/rack 32. In order to provide rack functionality, the accessory box 30 and the cargo rack 32 are designed to be relatively strong. The front storage box 14 is preferably made from metal, plastic, fiberglass, or other composite that provides adequate strength to act as both a rack and a storage compartment. Preferably, the accessory box 30 is designed for rated rack loads of approximately 90 pounds and inside cargo loads of approximately 50 pounds. Thus, the accessory box 30 can support the cargo rack 32 and the rack load without collapsing. Of course, the exact amount of support necessary by the accessory box 30 can vary widely depending on the specific uses for the ATV. Other components may also be secured to the main components of the front storage box 14 to give extra strength.

The accessory box 30 (or recessed cargo area) provides a volume in which items can be stored. The accessory box 30 is made up of a base and upwardly extending vertical front, side, and rear walls. The base 40 (see FIG. 6), front 42, side 44, and rear 46 walls may be formed of a single molded piece of material or may be formed of several pieces of material connected together. In one embodiment, the accessory box 30 has dimensions of approximately 34.5×17×3.5 inches. Preferably the base 40 of the accessory box 30 follows and mimics the front cab profile of the ATV 10 to provide as much cargo area as possible. Thus, as seen more clearly in FIG. 6, the base 40 of the accessory box 30 is not a flat surface but rather follows the contour of the front cab of the ATV 10. In the embodiment shown, for example, the base 40 of the accessory box 30 has first and second side recessed portions 48 which interface with the front cab portion 11 approximately over the front wheel covers 7. The base 40 of the accessory box 30 also has a central recessed portion 49 which interfaces with a central portion 9 of the front cab portion 11.

Referring again to FIGS. 4 and 5, the cargo rack 32 of the present invention functions both as a lid to the accessory box 30 and as a utility rack. Thus, the lid for the accessory box 30 is integral with and functions as the utility rack. The cargo rack 32 has upper and lower surfaces, 50 and 52 respectively, FIG. 4 illustrating the upper surface 50 of the cargo rack 32 and FIG. 5 illustrating the lower surface 52 of the cargo rack 32.

In addition to hauling items in the accessory box 30, items may be secured to the cargo rack 32. With particular attention to FIG. 4, the upper surface 50 of the cargo rack 32 is configured to provide a base for items that may be secured to the cargo rack 32. As such, the upper surface 50 may be provided with a non-slip surface. Preferably, the upper surface includes a series of ribs 54 extending approximately from the rearward edge 17 of the front storage box 14 to the forward edge 15 of the front storage box 14. Larger items, such as those usually carried on storage racks, may be attached to the cargo rack 32 using mounted D-rings, molded hooks or detents. In a preferred embodiment, six D-rings are provided along the upper surface 50 of the cargo rack 32 to serve as tie-down points to secure gear bags and other cargo to the cargo rack 32. The mounting points 56 for the D-rings are shown in FIG. 4.

As seen in FIG. 5, the lower surface 52 of the cargo rack 32 is reinforced to provide structural integrity for supporting rack loads of approximately 90 pounds. In one embodiment, the lower surface 52 of the cargo rack 32 is reinforced with a series of criss-crossing reinforcing ribs 58, preferably formed of plastic, fiberglass, or other composite. Alternately, the reinforcing ribs 58 may be formed of metal or other suitable material. Additional, support brackets 60 may be provided to provide further structural support. In the embodiment shown, two support brackets 60.

Figure 7:
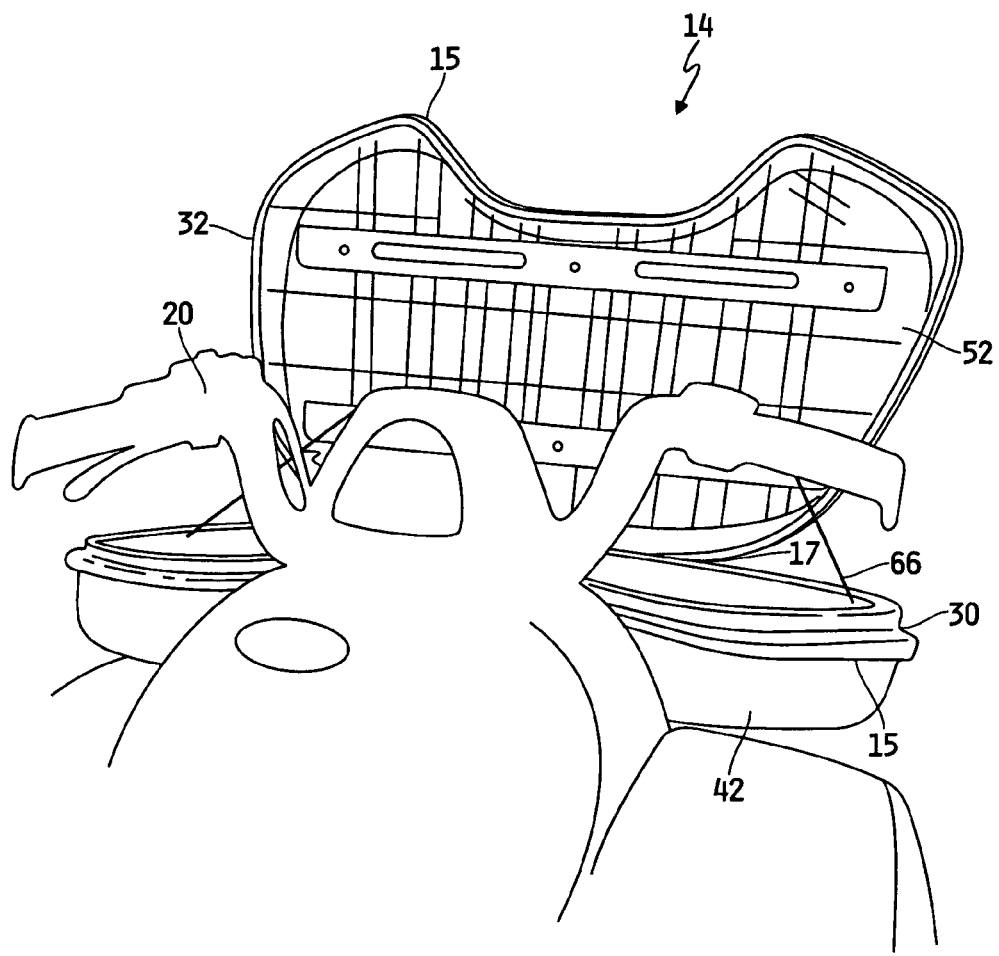
FIG. 7 is a rear side view of a front storage box in accordance with one embodiment of the present invention.

The cargo rack 32 is secured to the accessory box 30 with, for example, hinges or tabs and may be held closed with latches or straps. Preferably, the cargo rack 32 is hinged to the accessory box 30 along the forward edge 15 and has latches along the rearward edge 17 for latching to the accessory box. Hinges 62 and the latch mounting points 65 may be seen in FIG. 4 while latches 64 may be seen in FIG. 5. The cargo rack 32 may be lifted to accommodate placement of items into the accessory box 30. In the embodiment shown, the cargo rack 32 is configured to be opened forwardly. Thus, the cargo rack 32 is lifted upwardly from the rearward edge 17 thereof. Thus, as seen in FIG. 7, the accessory box 30 is accessible to an operator of the ATV when the ATV is in a stopped position without requiring the operator to dismount from the ATV. However, the cargo rack 32 may be configured to be lifted rearwardly (for example, if a windshield makes it impractical to access the accessory box 30 from the operator position), from either side, or lifted entirely from the accessory box 30 (wherein the cargo rack 32 is not hinged to the accessory box 30). The travel of the cargo rack 32 may be limited by lanyards 66, charged cylinders, springs, stops, or other suitable device.

Figure 6:
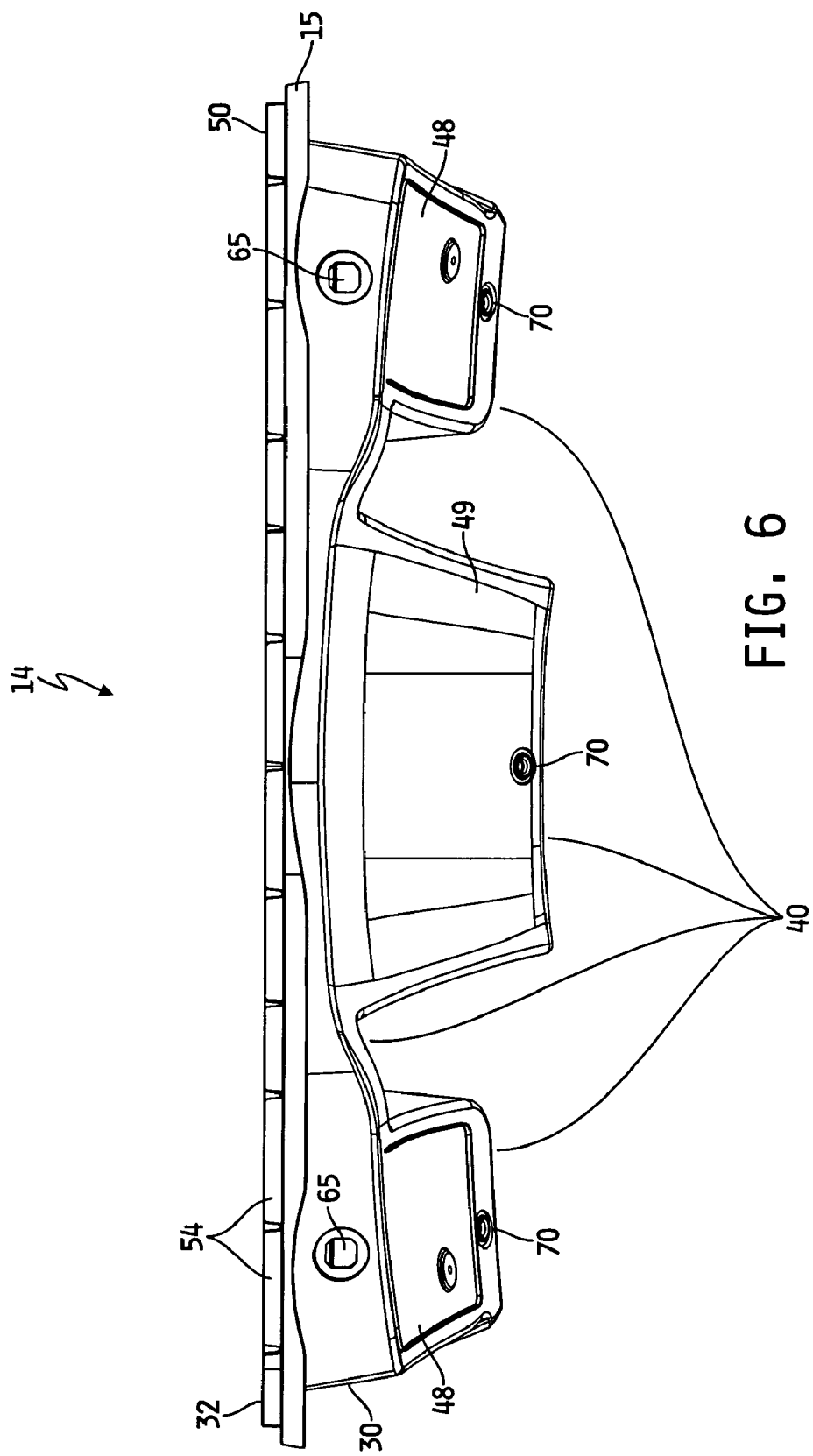
FIG. 6 is a plan rear view of a front storage box in accordance with one embodiment of the present invention.

The cargo rack 32 preferably seals the accessory box 30 to provide water tight storage. A rubber gasket 68 (see FIG. 5) is provided along the perimeter of the top edge of the accessory box 30 to provide a water tight seal. In one embodiment, the front storage box 14 is sealed and includes drain plugs 70 (see FIG. 6) such that it has cooler functionality. Thus, for example, ice and beverages may be placed in the front storage box 14. Upon melting of the ice, the resultant water may be removed by unplugging the drain plugs 70 and allowing the water to drain out. Preferably, a drainage plug 70 is provided at each recessed portion of the accessory box 30. Thus, for example, as seen in FIG. 6, a drainage hole 70 is provided at each of the side recessed portions 48 as well as at the central recessed portion 49.

FIG. 7 illustrates a the front storage box 14 from an operator's perspective on the ATV 10. The front storage box 14 is positioned at the forward extent of the ATV 10, in front of the handle bars 20 and generally over the front wheels 16. The front storage box 14 is mounted on the ATV 10 such that the upper surface 50 of the cargo rack 32 is at or below the level of the handle bars 20 of the ATV 10. Accordingly, the front storage box 14 is positioned entirely below the line of sight of an operator of ATV 10 and does not impair the safe operation of the ATV 10.

Thus, the front storage box 14 of the present invention adds more function to the ATV by providing a waterproof, accessory box 30 for items such as clothes, bungee cords, wallets, cameras, bait, flashlights, etc. In addition, the cargo rack 32 sealing the accessory box 30 provides increased carrying capacity.

While a preferred embodiment of the present invention has been described, it should be understood that various changes, adaptations, and modifications may be made therein without departing from the spirit of the invention and the scope of the appended claims.

The invention claimed is:

1. An all terrain vehicle comprising:
a chassis carrying a straddle-type seat which is sufficiently narrow to be straddled by a rider;
a pair of front wheels mounted to the chassis, and handlebars operatively connected to the front wheels for steering the vehicle;
a front cab portion including a pair of front wheel covers supported above the pair of front wheels, and a central portion positioned intermediate the pair of front wheel covers;
a pair of rear wheels mounted to the chassis;
a laterally extending footrest on each side of the chassis;
an engine carried by the chassis, the engine being connected to a drive train supplying motive power to at least some of the wheels; and
a front storage box including:
an accessory box, the accessory box providing a recessed cargo space and being sufficiently strong to support a rack load; and
a cargo rack, the cargo rack configured for use as a lid to the accessory box and as a rack for supporting a rack load;
the front storage box being mounted over and adjacent to the front cab portion and the front storage box including a base having a pair of side portions and a central portion positioned intermediate the pair of side portions, wherein the side portions of the base are curved to generally conform to the front wheel covers of the front cab portion, and the central portion of the base is curved to generally conform to the central portion of the front cab portion.

2. The all terrain vehicle of claim 1, wherein the accessory box further includes drain plugs.

3. The all terrain vehicle of claim 1, wherein the cargo rack is hinged to the accessory box.

4. The all terrain vehicle of claim 3, further including lanyards for limiting the travel of the cargo rack from the accessory box about the hinge.

5. The all terrain vehicle of claim 1, wherein the cargo rack has an upper surface and a lower surface, the upper surface being configured as a non-slip surface.

6. The all terrain vehicle of claim 1, wherein the cargo rack has an upper surface and a lower surface, the upper surface further including a series of ribs.

7. The all terrain vehicle of claim 1, wherein the cargo rack has an upper surface and a lower surface, the cargo rack further including mounting points for mounting cargo on the upper surface.

8. The all terrain vehicle of claim 7, wherein the mounting points are D-rings.

9. The all terrain vehicle of claim 1, wherein the cargo rack has an upper surface and a lower surface, the cargo rack further including reinforcing ribs along the lower surface.

10. The all terrain vehicle of claim 1, wherein the cargo rack is configured for operable attachment to the accessory box to provide a water tight seal.

11. The all terrain vehicle of claim 1, further comprising mounting points positioned intermediate the central portion and each of the side portions for coupling the front storage box to the front cab portion.

12. The all terrain vehicle of claim 11, further comprising channels configured to operably couple with the mounting points, each channel positioned below the base and extending between one of the side portions and the central portion.

13. An all terrain vehicle comprising:
a chassis carrying a straddle-type seat which is sufficiently narrow to be straddled by a rider;
a front cab portion including first and second wheel covers and a central portion;
a pair of front wheels mounted to the chassis, and handlebars operatively connected to the front wheels for steering the vehicle;
a pair of rear wheels mounted to the chassis;
a laterally extending footrest on each side of the chassis;
an engine carried by the chassis, the engine being connected to a drive train supplying motive power to at least some of the wheels; and a front storage box including:
an accessory box, the accessory box providing a recessed cargo space and being sufficiently strong to support a rack load, wherein the accessory box comprises a base, first and second side walls, a front wall, and a rear wall, and wherein the base of the accessory box is contoured to provide a plurality of recessed portions; and
a cargo rack, the cargo rack configured for use as a lid to the accessory box and as a rack for supporting a rack load;
the front storage box being mounted over and adjacent to the front cab portion of the all terrain vehicle and the plurality of recessed portions being curved to follow the first and second wheel covers and the central portion of the front cab portion.

14. The all terrain vehicle of claim 13, further including a drain plug at each of the recessed portions.

15. The all terrain vehicle of claim 12, further comprising mounting points positioned intermediate the plurality of recessed portions for coupling the front storage box to the front cab portion.

16. The all terrain vehicle of claim 15, further comprising channels configured to operably couple with the mounting points, each channel positioned below the base and extending between a pair of the recessed portions.

17. An all terrain vehicle comprising:
a chassis carrying a straddle-type seat which is sufficiently narrow to be straddled by a rider;
a pair of front wheels mounted to the chassis, and handlebars connected to the front wheels for steering the vehicle;
a pair of rear wheels mounted to the chassis;
a laterally extending footrest on each side of the chassis;
an engine carried by the chassis, the engine being connected to a drive train supplying motive power to at least some of the wheels; and
a front storage box including:
an accessory box, the accessory box providing a recessed cargo area and being sufficiently strong to support a rack load, wherein the accessory box has a forward edge and a rearward edge, a base, first and second side walls, a front wall, and a rear wall; and
a cargo rack, the cargo rack configured for use as a lid to the accessory box and as a rack for supporting a rack load, wherein the cargo rack has an upper surface and a lower surface, a forward edge and a rearward edge;
the front storage box being mounted over a front cab portion of the all terrain vehicle, the front storage box including a base having a pair of side portions, a central portion positioned intermediate the pair of side portions, and mounting points positioned intermediate the central portion and each of the side portions for coupling the storage box to the front cab portion.

18. The all terrain vehicle of claim 17, wherein the base of the accessory box is contoured to provide a plurality of recessed portions.

19. The all terrain vehicle of claim 18, further including a drain plug at each of the recessed portions.

20. The all terrain vehicle of claim 17, wherein the base, side walls, front wall and rear wall of the accessory box are integrally formed.

21. The all terrain vehicle of claim 17, further including hinges along the forward edge of the accessory box and the forward edge of the cargo rack for operably attaching the cargo rack to the accessory box.

22. The all terrain vehicle of claim 17, further including latches along the rearward edge of the cargo rack for removably engaging the cargo rack with the accessory box.

23. The all terrain vehicle of claim 17, further comprising:
a front cab portion including a pair of front wheel covers supported above the pair of front wheels, and a central portion positioned intermediate the pair of front wheel covers; and
wherein the side portions of the base are curved to generally conform to the front wheel covers of the front cab portion, and the central portion of the base is curved to generally conform to the central portion of the front cab portion.

* * * * *